Sept. 21, 1943.  T. ZUSCHLAG  2,329,810
ELECTROMAGNETIC INSPECTION
Filed Oct. 18, 1941  2 Sheets-Sheet 1
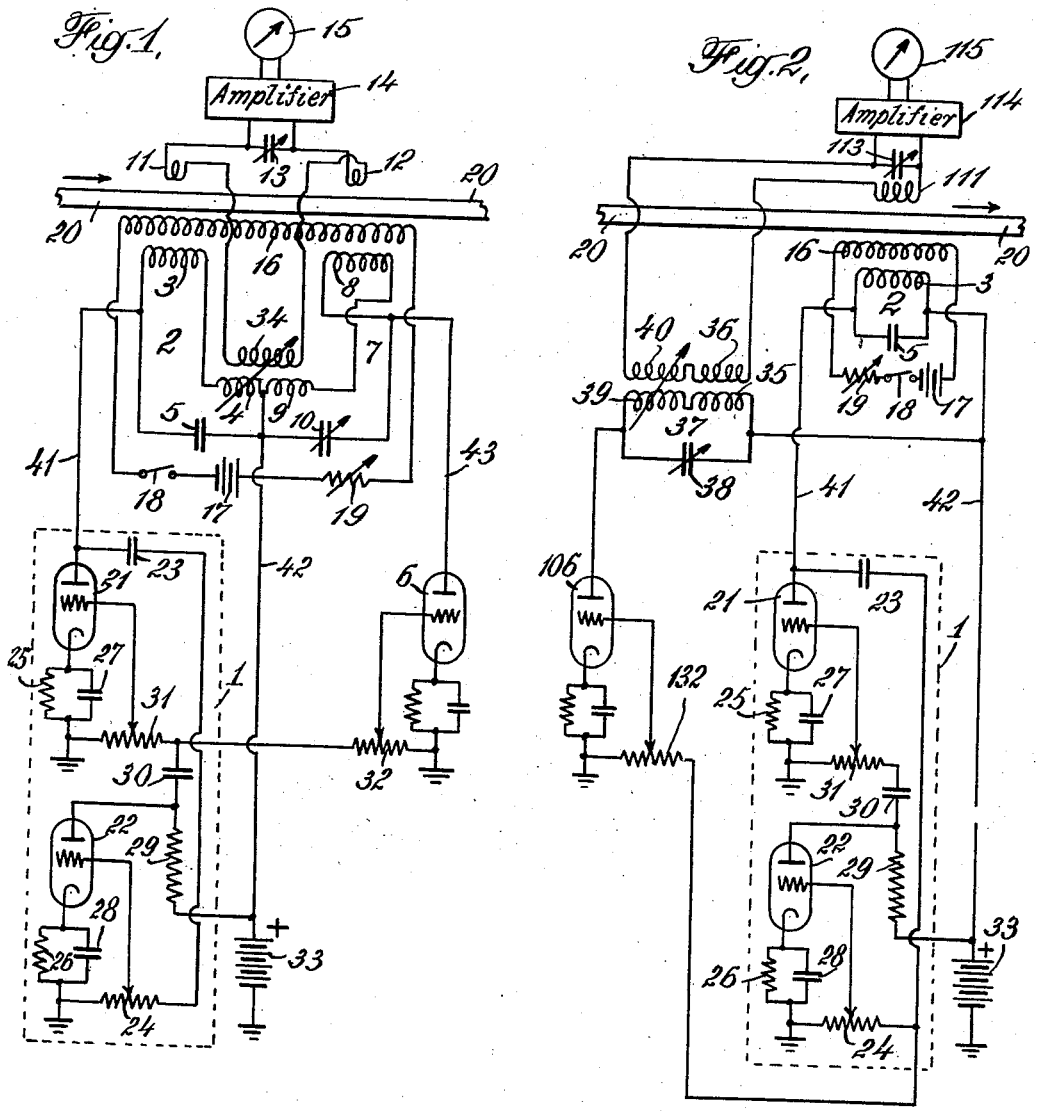
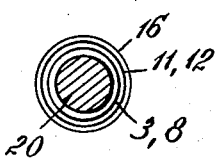
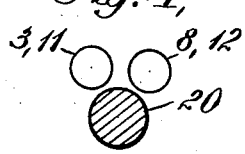
INVENTOR
Theodore Zuschlag
BY
Pennie, Davis Marvin and Edmonds
ATTORNEYS Sept. 21, 1943.　　　T. ZUSCHLAG　　　2,329,810
ELECTROMAGNETIC INSPECTION
Filed Oct. 18, 1941　　　2 Sheets-Sheet 2
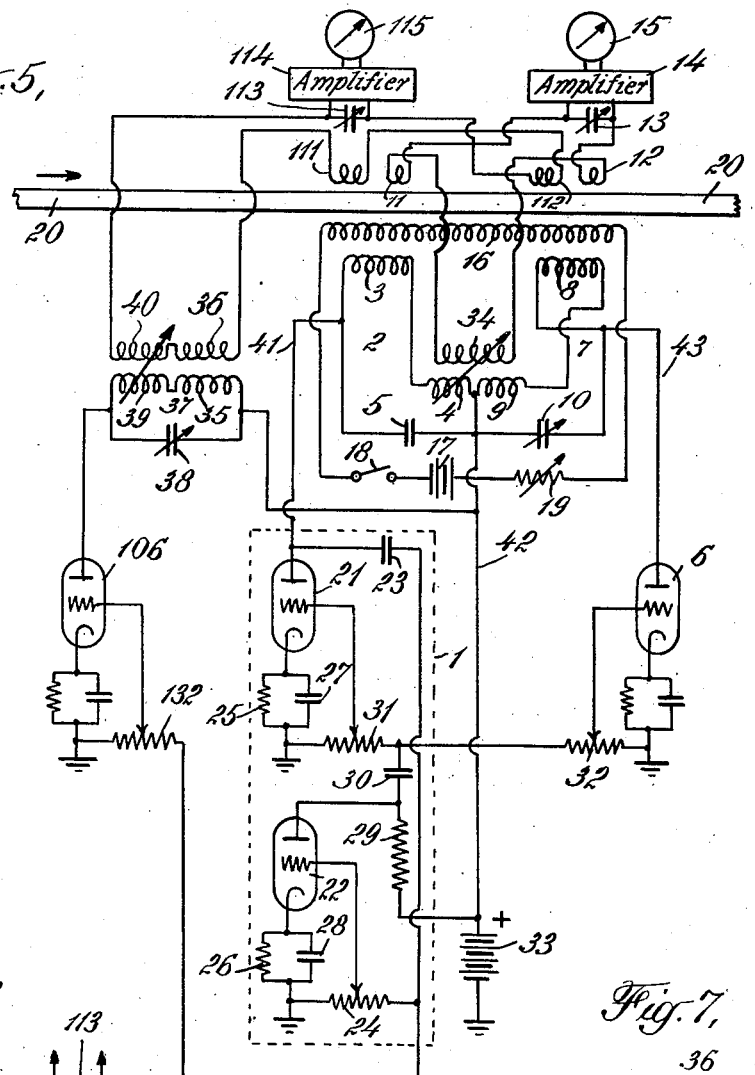
Fig. 5,
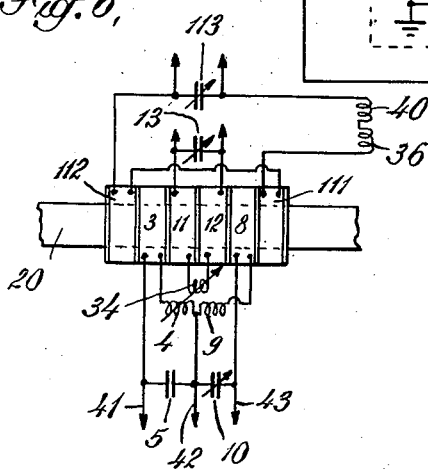
Fig. 6,
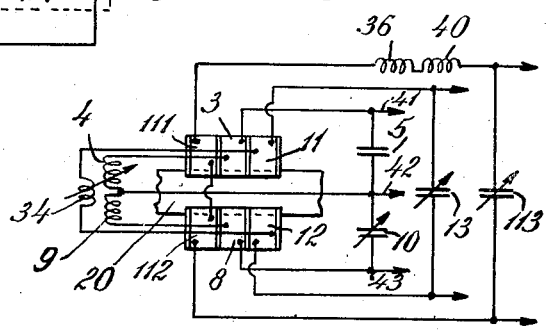
Fig. 7,
INVENTOR
Theodore Zuschlag
BY
Pennie, Davis, Marvin and Edwards
ATTORNEYS Patented Sept. 21, 1943

2,329,810

UNITED STATES PATENT OFFICE 2,329,810

ELECTROMAGNETIC INSPECTION

Theodore Zuschlag, West Englewood, N. J., assignor to Magnetic Analysis Corporation, Long Island City, N. Y., a corporation of New York Application October 18, 1941, Serial No. 415,551

19 Claims. (Cl. 175—183)

This invention relates to the art of non-destructive testing and inspection of metallic material, and more especially to electromagnetic inspection of such material by the use of alternating current fields.

Methods and apparatus heretofore proposed for electromagnetic inspection of metallic materials have included the use of alternating current for energizing the material, but one difficulty usually present in such systems has been in maintaining the energizing coil tuned to the frequency of the source of alternating current. The present invention overcomes this difficulty by including the energizing system as a part of an oscillator which furnishes the alternating current. Furthermore the oscillator is preferably of the variable feedback type employed in such manner as to provide maximum reaction in the presence of defects and variations in the material under test.

Other features of the invention comprise improved pickup systems including detector coils so related to the several circuits that one or more indicating devices coupled thereto will give extremely sensitive indications of defects or changes in material, composition or both. In other words, the system according to the invention is capable of indicating changes in structure, composition and physical dimensions, as well as flaws, such as seams, cracks and cavities. The foregoing and additional advantages introduced by this invention will become more apparent upon consideration of the following specification taken together with the drawings, wherein:

Fig. 1 is a circuit diagram of one embodiment of the invention wherein a voltage produced in a tuned energizing coil is compared with that produced in another coil inductively related to the object under test. This system is especially adapted to indicate structural defects.

Fig. 2 is a circuit diagram of an alternative form of the invention wherein a voltage produced in the tuned energizing coil is compared with a voltage produced in a standard coil not in inductive relation to the object under test. This embodiment is especially useful for indicating variations in the composition of the material under test.

Figs 3 and 4 represent, respectively, two different physical arrangements of coils with respect to the object under test, either of which may be employed in connection with the circuit arrangements of Figs. 1 and 2.

Fig. 5 is a circuit diagram of a preferred embodiment of the invention which combines features of the circuits of Figs. 1 and 2, and in certain respects is an improvement on both.

Figs. 6 and 7 are diagrams showing the manner in which the coils represented in Figs. 3 and 4, respectively, may be physically disposed and connected in the circuit of Fig. 5.

Referring now to the circuit diagram of Fig. 1, the apparatus included within the dash-line rectangle 1 comprises an oscillator of the variable feedback type. An oscillator of this type is disclosed in my copending U. S. patent application, Ser. No. 301,179, filed Oct. 25, 1939, now Patent No. 2,267,884. This oscillator includes two three-electrode vacuum tubes 21 and 22, and preferably they may comprise a tube of twin-type construction such as that known as type 6F8. The anode of tube 21 is coupled by means of condenser 23 to the adjustable potentiometer 24, the slider of which is connected to the grid of tube 22. This potentiometer thus controls the magnitude of voltage impressed on the grid of tube 22 which is derived from the output of tube 21. The cathodes of tubes 21 and 22 are coupled to ground through cathode biasing networks consisting of resistors 25 and 26 shunted by condensers 27 and 28, respectively. The anode of tube 22 is connected to the positive pole of potential source 23 through fixed resistor 29, and is coupled to potentiometer 31 through coupling condenser 30. The slider of potentiometer 31, which adjusts the effective amplification of tube 21, is connected to the grid of tube 21. Thus the output of tube 22 is coupled to the input of tube 21 by condenser 30 and potentiometer 31.

In addition to being coupled to the input of tube 22, the output of tube 21 is connected to tuned circuit 2 which consists of an alternating-current energizing coil or oscillator primary 3 in series with variocoupler primary winding 4 and fixed condenser 5. The output of tube 22 of this variable feedback oscillator is coupled through condenser 30 to volume control potentiometer 32 the slider of which is connected to the grid of an amplifier tube 6. Potentiometer 32 controls the effective amplification of amplifier tube 6, and the output of this tube is connected to tuned circuit 7 which, in electrical characteristics, is similar to tuned circuit 2. This circuit includes energizing coil or oscillator primary 8 connected in series with variocoupler primary winding 9, the other half of the variocoupler primary coil being winding 4 above mentioned. Both primary coils 8 and 9 are shunted by the variable tuning condenser 10. The two energizing coils or oscillator primaries 3 and 8 are inductively coupled respectively to concentrically arranged secondaries or detector coils 11 and 12 which are connected in opposition with regard to the current flow in primaries 3 and 8. The differential output of the two series-connected secondaries 11 and 12, which are shunted by tuning condenser 13, is coupled to an amplifier 14 and may be indicated by means of meter 15.

Amplifier 14 should be suitable for the frequencies employed, in which event the meter 15 would be a suitable alternating-current indicating device, usually a milliammeter, or the amplifier may include a rectifier and direct-current amplifier, in which case the meter 15 would be a direct-current instrument as described in my mentioned prior application Ser. No. 301,179 (Patent No. 2,267,884).

Tuned circuit 7 together with amplifier 6 which feeds it may be termed an auxiliary circuit. This circuit together with auxiliary detector coil 12 coupled thereto comprises an auxiliary system because it is employed to balance the oscillator system which comprises oscillator 1, tuned circuit 2 and detector coil 11 coupled thereto. Variocoupler secondary coil 34 is common to both the auxiliary system and oscillator system. Current flows in opposite directions in coils 3 and 8, so it is necessary to reverse these coils with respect to each other in order that together they may produce a single energizing field. One of coils 11 and 12 is then reversed with respect to this field to provide the required balance.

As pointed out in my mentioned copending application Serial No. 301,179, (Patent No. 2,267,884) the type of oscillator here described is affected by changes in the tuned output circuit resulting in a pronounced amplitude change of the voltages impressed upon coils 3 and 8. This characteristic is, however, desirable in the testing system of this present invention because the variations in oscillator output are thereby more pronounced in the presence of defects or variations in the material under test.

Also included in the coil system is a direct-current energizing coil 16 connected in series with a source of direct current 17, a control switch 18, and a rheostat 19 variable to control the strength of the direct-current magnetic field set up by the coil 16. The manner of use of this direct-current circuit will be described later. Coils 3, 8, 11, 12 and 16 are preferably disposed in a symmetrical assembly and arranged to be placed in inductive relation to an article to be tested as represented by the bar 20. Usually this material under test would be placed either within the mentioned coils, as shown in Fig. 3, or symmetrically adjacent them, as shown in Fig. 4.

The system of Fig. 1 is adjusted as follows: potentiometers 24 and 31 are first adjusted to place the oscillator itself in oscillating condition, while indicating meter 15 is observed. Usually this meter suddenly will give a high reading, after which by careful manipulation of the potentiometers this reading can be gradually decreased to a low value, indicating that the oscillator is oscillating, but not violently. Assuming that the specimen 20 under test, which may be either moving or stationary, is placed in inductive relation with the coils 3, 8, 11, 12 and 16 direct current is caused to flow in coil 16 by closure of switch 18. Next, tuning condenser 10 and potentiometer 32 are adjusted until the meter 15 indicates a minimum reading, ordinarily substantially zero. Condenser 10 is employed to adjust the phase of the current in coil 8 in relation to the current in coil 3. Subsequent adjustment of variocoupler secondary coil 34 with respect to stationary primary coils 4 and 9 enables attainment of a fine adjustment in the secondary detector circuit including coils 11 and 12; and because of the design of the variocoupler this adjustment may provide a range from positive through zero to negative values. After the foregoing adjustments have been made, and the specimen 20 is moved past the coil assembly, and the indicating device 15 will indicate a fluctuation whenever a defect or structural change comes within the magnetic influence of the coil system, and this will be true even of very minor defects because of the great sensitiveness of the system described.

Variocoupler 4—9, 34 reduces the efficiency of the energizing coils 3, 8 in the ratio of their respective inductances. It is therefore preferable to keep the number of primary turns of the variocoupler as low as possible. This variocoupler may conveniently be constructed from a suitable type of variometer by disconnecting the rotor and stator windings to form a movable secondary coil and split primary coils. The purpose of this variocoupler is to control the amplitude of the effective voltage induced in the secondary or detector circuit, and, therefore, an alternative arrangement can be here employed which eliminates the variocoupler and allows of fine adjustment by a decade potentiometer which replaces the simple potentiometer 32. It has been found in practice that by the use of such a decade potentiometer connected as just indicated, a degree of control is obtained in a ratio of as much as 1 to 100,000 which is ordinarily ample for the purpose.

Consideration of the circuit arrangement of Fig. 1 will show that the frequency of the alternating current flowing in coil 3 is determined by the electrical constants of circuit 2, that a corresponding alternating voltage is impressed upon amplifier tube 6, and that the magnitude of the current of like frequency which flows in energizing coil 8 is controlled by adjustment of potentiometer 32. If the electrical constants of the two tuned circuits 2 and 7 are alike it is possible to make the voltage induced in secondaries 11 and 12 identical. In this case, of course, no deflection is shown at meter 15. The strength of the differential field impressed across condenser 13 may be varied considerably by suitable tuning of this circuit to or near the frequency of oscillator 1. By such tuning the voltage input to amplifier 14 is increased and transfer of undesirable harmonics is decreased. Adjustment of potentiometers 24 and 31 may vary the frequency of the oscillator slightly, but this does not affect the essential operation.

As long as the specimen 20 under test is uniform the output of amplifier 14 will remain substantially zero, but as soon as a defect or otherwise different section of the specimen enters the field of coil 3 (assuming movement from left to right as indicated by the arrow), the tuning of circuit 2 changes and the oscillator operates at a different frequency. This upsets the balance between the secondary coils 11 and 12 which results in a deflection of meter 15. The amount of this deflection depends not only upon the nature of the disturbance, which in turn depends upon the nature of the defect and its effect upon the apparent inductance of coil 3, but also upon the adjustment of oscillator 1 with regard to the setting of feedback potentiometer 24 and the tuning of the secondary circuit 11, 12, 13. The mentioned change in apparent inductance of coil 3 not only causes the oscillator to operate at a different frequency, but also results in a change in the electrical characteristics of tuned circuit 2 so that it completely differs from that of tuned circuit 7 which then carries current at a frequency for which it was not originally adjusted. The results of this upset condition causes a pronounced indication of the meter 15 even for a most minute defect in the material under test, thus providing extraordinarily great sensitivity.

The apparatus described may be used to inspect specimens of uniform cross-section such as bars and tubes of non-ferrous or ferrous materials, including copper, brass, aluminum, hot-rolled, cold-drawn, annealed, alloy, stainless steel and many other products. When inspecting non-ferrous or non-magnetic material it is not necessary to use direct-current energizing coil 16, but when testing magnetic material the superposition of a direct-current field has a very beneficial effect upon the test performance of the specimen under observation. Without the superposition of a direct-current field, slight but meaningless changes in permeability of the material may be excessive for the extreme sensitivity of the present testing equipment. These undesired fluctuations can be reduced to insignificant values by the superposition of a relatively weak direct-current field. In this case a coil having 4,000 or 5,000 ampere turns is sufficient. The advantage of such direct-current superposition is mentioned in Austrian Patent 98,935, published December 27, 1924, which discloses an alternating-current field combined with a direct-current field to obtain results which cannot be duplicated by using either alternating current or direct current energization alone.

In order better to understand the operation of the system of the present invention it is helpful to analyze the changes in the apparent inductance of coils 3 and 8 when a metallic body passes through the fields of these coils. Assuming first that the conducting body is composed of a non-ferrous metal, then the passage of such a body, according to well known laws, increases the apparent resistance and lowers the apparent inductance of this coil. The same of course holds true for a body of ferrous material, except for the fact that its higher permeability checks the tendency of the inductance to drop and in most cases results in a somewhat higher inductance value. The increase caused by the higher permeability is however not of a magnitude which would correspond to the actual permeability value. For instance, the passing of a steel bar having a permeability of 200 to 400 times the permeability of air through a concentrically disposed coil carrying alternating current at 60 cycles increases the inductance from 200% to 400% only. Upon increase of applied frequency, the apparent inductance due to the iron decreases and very soon drops to a value where it equals the inductance of an air-core coil. The frequency at which this equality occurs is sometimes called the "critical" frequency. It depends upon the grade and size of the material involved, and for solid material is found well within the range of the upper audio frequencies.

Superimposing a D. C. (direct-current) field upon the field of an A. C. (alternating-current) energizing coil containing a ferro-magnetic body has the effect of artificially lowering the value of critical frequency or the amount of apparent A. C. permeability. I have found that for higher frequencies the effect of the superimposed D. C. field is more pronounced and, in other words, less D. C. magnetization is required to make the material non-magnetic with relation to the applied A. C. Using lower frequencies of the order of 500 to 1,000 cycles, higher D. C. magnetization is needed to accomplish this purpose than with frequencies of the order of 5,000 to 10,000 cycles. In no case, however, does the superimposed D. C. saturate the material to such an extent that it becomes nonmagnetic solely on account of its magnetic saturation. It appears to be a physical impossibility to attain magnetic saturation in open magnetic circuits even by the most intense D. C. fields. The effect observed and ascribed by some investigators to magnetic "saturation" of the material, appears to represent simply the effect of the alternating magnetic phenomenon described above.

Referring to Fig. 2, oscillator 1, which in itself is similar to oscillator 1 of Fig. 1, is connected to tuned circuit 2 which consists of energizing coil 3 and fixed condenser 5. The output of tube 21 of oscillator 1 is coupled through condenser 23 and potentiometer 132 to a separate amplifier tube 106. (In connection with Figs. 2 to 7 circuit elements having similar functions to corresponding elements in Fig. 1, have been indicated by the same reference characters plus 100. Similar elements have similar reference characters throughout.) The anode of this amplifier tube is connected to tuned circuit 37 comprising primary energizing coil 35 in series with the variocoupler primary coil 39, both of which are shunted by variable condenser 38. Coil 35 may be considered as a "standard" coil. The secondary coil 36 coupled to primary coil 35 is connected in series with the adjustable variocoupler secondary 40 and is connected in opposition with the detector coil or secondary 111 of energizing primary coil 3. Secondary coils 40 and 36 and primary coils 39 and 35 may be combined into one movable secondary coil and one stationary primary coil, with a somewhat decreased fineness of control. Tuning condenser 113 is shunted across the input of amplifier 114 having a suitable indicating meter 115 coupled to the output thereof. The effective amplification of amplifier 106 is controlled by potentiometer 132, and the amplified current from this amplifier flows through primary coils 39, 35, which together with variable tuning condenser 38 comprise tuned circuit 37. The direct-current energizing coil 16 comprising part of the coil assembly, as in Fig. 1, is connected in series with the direct-current source 17, switch 18 and control rheostat 19. The anodes of tubes 21 and 106 are connected through lead 42 to the positive terminal of anode potential supply 33. This same terminal is also connected through resistor 29, as shown, to the anode of tube 22.

In general, the system of Fig. 2 is adjusted in a manner corresponding to that of Fig. 1. Assuming, for example, that a bar 20 is passing through the coil assembly for test, output meter 115 can be balanced to zero or substantially to zero as described in connection with Fig. 1, by adjusting volume control potentiometer 132, tuning condenser 38 and variocoupler 39—40. The amount of deflection caused by the passage of a deflect may be varied by suitable adjustment of tuning condenser 113, in addition to adjustment of the variocoupler and of potentiometer 106.

Here, as in Fig. 1, the auxiliary system including amplifier 106, tuned circuit 37 and secondary circuit 40, 36, 111, 113 is balanced against the oscillator system comprising oscillator 1, tuned circuit 2, and detector coil 111 coupled thereto. The secondary or detector circuit above identified corresponds to that of Fig. 1 including coils 11, 12 and 34 and condenser 13. Thus coil 111 of Fig. 2 performs in effect two functions. The coil assembly which is represented in this instance by coils 3, 16 and 111 may be of the concentric or eccentric type, as illustrated respectively in Figs. 3 and 4.

Referring to Fig. 3, the shaded circle represents a cross-section through the test material 20, while the rings concentrically surrounding this section represent the coils 3, 8, 11 and 12, the direct-current coil 16. With this coil arrangement lower frequencies can be employed than with the arrangement of Fig. 4. For example, frequencies in the neighborhood of 5,000 cycles may be employed.

Referring to Fig. 4, again the shaded circle represents a section through the test material 20, while the two smaller rings represent sections through coils 3, 11 and 8, 12, laterally displaced in a manner similar to that described in my copending application for U. S. Letters Patent Ser. No. 334,790, filed May 13, 1940. With this eccentric coil arrangement it is not necessary to superimpose direct-current energization, so coil 16 is not here shown. In this arrangement, due to the small diameter of the coils, somewhat higher frequencies, for example in the neighborhood of 15,000 cycles, may be employed.

Testing systems of the type of Fig. 2 possess the advantage of indicating the full length of flows passing through the test coils. In this respect this type of system differs in the type of indication from that of Fig. 1 in that a defect such as a longitudinal crack, for example, in tubing would, in the system of Fig. 2, result in continuous deflection of the indicating device from the beginning to the end of the defect as it passes through the test coils; whereas in the case of Fig. 1 a transitory deflection occurs when the defect first enters the test coil system and another deflection occurs when the defect leaves the coil system. For this reason the system of Fig. 2 is adapted not only to indicate extended defects such as longitudinal cracks, but also persistent conditions which differ from any standard for which the system is initially adjusted. This would include changes in the structure, composition, or homogeneity of the material itself. However, the overall sensitivity of the system of Fig. 2 is somewhat less than that of the system of Fig. 1, because of the greater proportion of harmonics caused by the usual electrical dissimilarity of tuned circuits 2 and 37. In the event that this becomes in certain instances a disadvantage it can be avoided by combining the system of Fig. 2 with that of Fig. 1 as indicated in Fig. 5. In such a combined system the sections of the system cooperate to provide a complete testing system having in one embodiment the best characteristics of each system alone without any of the disadvantages.

Referring now to Fig. 5, an output of oscillator 1 which comprises the same elements as represented in Fig. 1 is directly connected to tuned circuit 2 and another output is connected through amplifier 6 and lead 43 to tuned circuit 7, also as in Fig. 1. In addition, the first-mentioned output of the oscillator is coupled through condenser 23 and amplifier 106 to tuned circuit 37, as in Fig. 2. The primary energizing circuits are similar to those of Figs. 1 and 2, corresponding elements being similarly designated in the drawings. The secondary circuits are also similar to the corresponding circuits of Figs. 1 and 2, although in the case of the system of Fig. 5, the secondary circuits are connected with elements in common to both systems so that they may be employed simultaneously with the systems balanced against each other. To illustrate, secondary coils 11 and 12 are connected in series with variocoupler secondary coil 34 in Fig. 1, and likewise in Fig. 5; and in the arrangements of both figures, coil 11 is coupled to coil 3 and coil 12 is coupled to coil 8. However, in Fig. 2 variocoupler secondary coil 40 is connected in series with secondary coil 111 which is coupled to coil 3, whereas coil 40 in Fig. 5 is connected in series not only with coil 111 which is coupled to primary coil 3, but is connected in series also with coil 112 which in turn is coupled to primary coil 8. Thus a coil in each system is connected to a coil coupled to the other system, whereby the balance of the combined system depends not only upon the balance in the separate systems but also upon the balance between the systems. This interrelated balance provides an interrelated response and sensitivity different from that of either system alone and superior to the mere summation of both.

Amplifier 14 with its indicating device 15 and amplifier 114 with its indicating device 115 are connected respectively across tuning condensers 13 and 113, as in Figs. 1 and 2, respectively. Anode potential source 33 is connected through leads 42 and 41 to furnish potential to the anode of tube 21 and through leads 42 and 43 to furnish potential to the anode of tube 6. Tube 106 also is furnished with anode potential from lead 42 and, as in the preceding figures, tube 22 is supplied with anode potential through resistor 29.

In practice the operation of the testing system of Fig. 5 is essentially the same as that described in connection with Figs. 1 and 2. In adjusting the apparatus it will usually be found convenient first to follow the adjusting procedure outlined in connection with the system of Fig. 1 and subsequently to follow the adjusting procedure outlined in connection with the system of Fig. 2. Because of the mutual coupling, there is some interaction between the two portions of the entire system, and this may make necessary readjustment of variocoupler 34, and occasionally of potentiometer 32, in order to obtain a minimum indication on each of indicating devices 15 and 115 under standard conditions before testing an unknown specimen. By watching meters 15 and 115, defects of substantially all types as well as changes in composition or form of the material itself can be instantly observed and identified as to type, even in the most minute instances. Thus, the present invention provides in a single testing system not only great sensitivity, but also the ability to indicate substantially all types of defects encountered in metallic materials especially at the mill.

Fig. 6 is a schematic diagram showing the manner in which coils disposed as in Fig. 3 are electrically connected in the system of Fig. 5. For clarity in the drawings, coil 16 has not been illustrated in Fig. 6, but it may be wound concentrically with all of the other coils from coil 111 to coil 112, and so as to envelope them if desired. Similarly, Fig. 7 is a schematic diagram showing the manner in which coils disposed as in Fig. 4 are connected in the system of Fig. 5, as an alternative to the arrangement of Figs. 3 and 6. The longitudinal arrangement of the coils of Figs. 3 and 4 may be the same as shown in Figs. 6 and 7. In all of these figures corresponding elements are represented by the same reference characters.

I claim:

1. In apparatus for electromagnetic inspection of matrial, the combination which comprises an oscillator system having at least one output circuit, an energizing coil connected to an output circuit of said system and forming a tuning element of said system, an auxiliary system having an auxiliary coil effectively coupled to an output circuit of said oscillator system, a secondary circuit coupled in common to said oscillator system and to said auxiliary system, an indicating device effectively coupled to said oscillator system and to said auxiliary system, and adjustable means associated with said secondary circuit and at least one of said systems for balancing the voltage established in said energizing coil against the voltage established in said auxiliary coil.

2. In apparatus for electromagnetic inspection of material, the combination which comprises a variable feedback oscillator system having at least one ouput circuit, an energizing coil connected in an ouput circuit of said system and forming a tuning element of said system, an auxiliary system having an auxiliary coil coupled to an output circuit of said oscillator system, said energizing coil and said auxiliary coil being disposable in magnetic relation to said material, a secondary circuit coupled in common to said oscillator system and to said auxiliary system, an indicating device effectively coupled to said oscillator system and to said auxiliary system, and adjustable means associated with said secondary circuit and at least one of said systems for balancing the voltage established in said energizing coil against the voltage established in said auxiliary coil.

3. In apparatus for electromagnetic inspection of material, the combination which comprises an oscillator system including an oscillator and a tuned primary circuit comprising at least an energizing coil and a tuning condenser, the frequency of said oscillator being determined at least in part by the tuned frequency of said primary circuit; an auxiliary system including an auxiliary coil, a variocoupler primary coil and a tuning condenser; a secondary circuit including a variocoupler secondary coil and two secondary coils coupled, respectively, to said energizing coil and to said auxiliary coil; means including said energizing coil and at least one of said secondary coils whereby said material may be disposed in inductive relation to elements of said primary and secondary circuits; and indicating means coupled to said secondary circuit.

4. In apparatus for electromagnetic inspection of material, the combination which comprises an oscillator system having at least one output circuit; two primary circuits each effectively connected to an output circuit of said system, each primary circuit including a primary coil and a tuning condenser, one of said condensers being variable; a secondary circuit including in series two secondary coils and the secondary of a variocoupler; a primary of said variocoupler being connected in series with one of said primary coils, each primary coil being electromagnetically coupled to one of said secondary coils in such sense that the voltages induced by said primary coils in said secondary coils are in opposition; at least one each of said primary and secondary coils being disposable in magnetic relation to said material; an indicating device coupled to said secondary circuit; and control means connected in said oscillator system for adjusting the output thereof.

5. In apparatus for electromagnetic inspection of material, the combination which comprises a variable feedback oscillator system having at least one output circuit; two primary coils each effectively connected to an output circuit of said system, two condensers one of which is connected to tune each primary coil; two detector coils connected in a secondary circuit, said secondary circuit being energized solely by electromagnetic coupling with said oscillator system, each of said detector coils being electromagnetically coupled to one of said primary coils, respectively; said primary coils and said detector coils being so connected in their respective circuits and so poled relative to each other that the voltages induced in said detector coils are in opposition; at least one each of said primary and detector coils being disposable in magnetic relation to said material; an indicating device coupled to said secondary circuit; and adjusting means for balancing the effective voltage induced in said secondary circuit against the effective voltage across said primary coils.

6. In apparatus for electromagnetic inspection of material, the combination which comprises a variable feedback oscillator having at least one output circuit; two primary circuits each effectively connected to an output circuit, each primary circuit including a primary coil, a tuning condenser and at least a portion of the primary of a variocoupler, one of said condensers being variable; a secondary circuit including in series two detector coils and the secondary of said variocoupler; each primary coil being electromagnetically coupled to one of said detector coils, respectively, in such sense that the voltages induced in said detector coils are in opposition; said primary and detector coils being disposable in magnetic relation to said material; an indicating device coupled to said secondary circuit; and control means connected in said oscillator system for adjusting the output voltages thereof.

7. In apparatus for electromagnetic inspection of material, the combination according to claim 6, wherein said indicating device is coupled to said secondary circuit across a variable condenser connected in series in said secondary circuit.

8. In apparatus for electromagnetic inspection of material, the combination which comprises, an oscillator system including a feedback oscillator, a tuned primary circuit comprising an energizing coil connected in series with a first primary winding of a variocoupler, and a tuning condenser connected in shunt with said coil and winding, said primary circuit being effectively connected in an output circuit of said oscillator whereby the oscillation frequency of said oscillator is determined at least in part; an auxiliary system including a tuned primary circuit comprising an auxiliary coil connected in series with a second primary winding of said variocoupler, a tuning condenser connected in shunt with said auxiliary coil and second primary winding, and an amplifier connected to couple an output circuit of said oscillator to the primary circuit of said auxiliary system; a detector circuit comprising a first detector coil coupled to said energizing coil and connected in series with a variable condenser, with a second detector coil which is coupled to said auxiliary coil and with a variocoupler secondary winding which is adjustably coupled to said first and second primary windings; an indicating device coupled across said variable condenser; and means for passing said material through the fields of all of said coils.

9. In apparatus for electromagnetic inspection of material, the combination which comprises, an oscillator system including a feedback oscillator, a tuned primary circuit comprising an energizing coil connected in series with a first primary winding of a variocoupler, and a tuning condenser connected in shunt with said coil and winding, said primary circuit being effectively connected in an output circuit of said oscillator whereby the oscillation frequency of said oscillator is determined at least in part; an auxiliary system including a tuned primary circuit comprising an auxiliary coil connected in series with a second primary winding of said variocoupler, a tuning condenser connected in shunt with said auxiliary coil and second primary winding, and an amplifier connected to couple an output circuit of said oscillator to the primary circuit of said auxiliary system; a detector circuit comprising a first detector coil coupled to said energizing coil and connected in series with a variable condenser, with a second detector coil which is coupled to said auxiliary coil and with a variocoupler secondary winding which is adjustably coupled to said first and second primary windings; an indicating device coupled across said variable condenser; means for adjusting the degree of amplification of said amplifier; means for adjusting the magnitude of the output of said oscillator; a direct-current coil and means for passing controlled direct current therethrough.

10. In apparatus for electromagnetic inspection of material, the combination which comprises, an oscillator system including a feedback oscillator, a tuned primary circuit comprising an energizing coil connected in shunt with a condenser, said primary circuit being effectively connected in an output circuit of said oscillator whereby the oscillation frequency of said oscillator is determined at least in part; an auxiliary system including a tuned primary circuit comprising an auxiliary coil connected in series with a primary winding of a variocoupler, a tuning condenser connected in shunt with said auxiliary coil and primary winding, an amplifier connected to couple an output circuit of said oscillator to the primary circuit of said auxiliary system; a secondary circuit comprising a first secondary coil coupled to said energizing coil and connected in series with a variable condenser, with a secondary winding of said variometer and with a second secondary coil which is coupled to said auxiliary coil; an indicating device coupled across said variable condenser; and means for passing said material through the fields of said energizing coil and said first secondary coil.

11. In apparatus for electromagnetic inspection of material, the combination which comprises, an oscillator system including a feedback oscillator, a tuned primary circuit comprising an energizing coil connected in shunt with a condenser, said primary circuit being effectively connected in an output circuit of said oscillator whereby the oscillation frequency of said oscillator is determined at least in part; an auxiliary system including a tuned primary circuit comprising an auxiliary coil connected in series with a primary winding of a variocoupler, a tuning condenser connected in shunt with said auxiliary coil and primary winding, an amplifier connected to couple an output circuit of said oscillator to the primary circuit of said auxiliary system; a secondary circuit comprising a first secondary coil coupled to said energizing coil and connected in series with a variable condenser, with a secondary winding of said variometer and with a second secondary coil which is coupled to said auxiliary coil; an indicating device coupled across said variable condenser; means for adjusting the degree of amplification of said amplifier; means for adjusting the magnitude of the output of said oscillator; a direct-current coil and means for passing controlled direct-current therethrough; and means for passing said material through the fields of said energizing coil said first secondary coil and said direct-current coil.

12. In apparatus for electromagnetic inspection of metallic material for variations in structure and composition, the combination which comprises, an oscillator system including a feedback oscillator, a tuned energizing circuit comprising an energizing coil connected in series with a first primary winding of a first variocoupler, and a tuning condenser connected in shunt with said coil and winding, said energizing circuit being connected in an output circuit of said oscillator whereby the oscillation frequency of said oscillator is determined at least in part; a first auxiliary system including a tuned primary circuit comprising a first auxiliary coil connected in series with a second primary winding of said first variocoupler, a tuning condenser connected in shunt with said first auxiliary coil and second primary winding and an amplifier connected to couple and output circuit of said oscillator to the primary circuit of said first auxiliary system; a second auxiliary system including a tuned primary circuit comprising a second auxiliary coil connected in series with a primary winding of a second variocoupler, a tuning condenser connected in shunt with said second auxiliary coil and said last named primary winding, a second amplifier connected to couple an output circuit of said oscillator to the primary circuit of said second auxiliary system; a detector circuit comprising in series a first detector coil which is coupled to said energizing coil, a first variable condenser, a second detector coil which is coupled to said first auxiliary coil and a variocoupler secondary winding which is adjustably coupled to said first and second primary windings of said first variocoupler; a secondary circuit comprising in series a first secondary coil which is coupled to said energizing coil, a second secondary coil which is coupled to said first auxiliary coil, a second variable condenser, a secondary winding of said second variometer, and a third secondary coil which is coupled to said second auxiliary coil; whereby said detector circuit and said secondary circuit are energized solely by said oscillator; a first indicating device coupled across said first variable condenser; a second indicating device coupled across said second variable condenser; and means for passing said material through the fields of said energizing and first auxiliary coils, said first and second detector coils, and said first and second secondary coils.

13. In apparatus for electromagnetic inspection of metallic material for variations in structure and composition, the combination which comprises, an oscillator system including a feedback oscillator, a tuned energizing circuit comprising an energizing coil connected in series with a first primary winding of a first variocoupler, and a tuning condenser connected in shunt with said coil and winding, said energizing circuit being connected in an output circuit of said oscillator whereby the oscillation frequency of said oscillator is determined at least in part; a first auxiliary system including a tuned primary circuit comprising a first auxiliary coil connected in series with a second primary winding of said first variocoupler, a tuning condenser connected in shunt with said first auxiliary coil and second primary winding and an amplifier connected to couple an output circuit of said oscillator to the primary circuit of said first auxiliary system; a second auxiliary system including a tuned primary circuit comprising a second auxiliary coil connected in series with a primary winding of a second variocoupler, a tuning condenser connected in shunt with said second auxiliary coil and said last named primary winding, a second amplifier connected to couple an output circuit of said oscillator to the primary circuit of said second auxiliary system; a detector circuit comprising in series a first detector coil which is coupled to said energizing coil, a first variable condenser, a second detector coil which is coupled to said first auxiliary coil and a variocoupler secondary winding which is adjustably coupled to said first and second primary windings of said first variocoupler; a secondary circuit comprising in series a first secondary coil which is coupled to said energizing coil, a second secondary coil which is coupled to said first auxiliary coil, a second variable condenser, a secondary winding of said second variometer, and a third secondary coil which is coupled to said secondary auxiliary coil; whereby said detector circuit and said secondary circuit are energized solely by said oscillator; a first indicating device coupled across said first variable condenser; a second indicating device coupled across said second variable condenser; means for adjusting the degree of amplification of said first and second amplifiers; means for adjusting the magnitude of the output of said oscillator; a direct-current coil and means for passing controlled direct current therethrough; and means for passing said material through the fields of said energizing and first auxiliary coils, said first and second detector coils, said first and second secondary coils, and said direct-current coil.

14. In apparatus for electromagnetic inspection of metallic material for variations in structure and composition, the combination which comprises, an oscillator system including a feedback oscillator and a tuned energizing coil connected in an output circuit of said oscillator whereby at least in part to determine the frequency of said oscillator, a first and a second auxiliary system each energized by said oscillator and each including a tuned auxiliary coil; a secondary circuit including a first coil coupled to said energizing coil, a second coil coupled to the coil in said first auxiliary system and a third coil coupled to the coil in said second auxiliary system; a detector circuit including a coil coupled to said energizing coil and a coil coupled to said coil in said first auxiliary circuit; indicating means coupled to an element of said secondary circuit; indicating means coupled to an element of said detector circuit; and means for passing said material through the fields of said energizing coil, said detector coils, and said first and second coils in said secondary circuit.

15. In apparatus for electromagnetic inspection of metallic material for variations in structure and composition, the combination which comprises, an oscillator system including a feedback oscillator and a tuned energizing coil connected in an output circuit of said oscillator whereby at least in part to determine the frequency of said oscillator, a first and a second auxiliary system each energized by said oscillator and each including a tuned auxiliary coil; a secondary circuit including a first coil coupled to said energizing coil, a second coil coupled to the coil in said first auxiliary system and a third coil coupled to the coil in said second auxiliary system; a detector circuit including a coil coupled to said energizing coil and a coil coupled to said coil in said first auxiliary circuit; indicating means coupled to an element of said secondary circuit; indicating means coupled to an element of said detector circuit; means for adjusting the magnitude of the output of said oscillator; a direct-current coil and means for passing controlled direct current therethrough; and means for passing said material through the fields of said energizing coil, said detector coils, said first and second coils in said secondary circuit and said direct-current coil.

16. In apparatus for electromagnetic inspection of material, the combination which comprises, a variable feedback oscillator system, an auxiliary coil system, means for differentially coupling said auxiliary system to said oscillator system whereby to energize said auxiliary system, means for balancing a voltage induced in an element of said auxiliary system against a voltage induced in an element of said oscillator system, means for passing material to be inspected in inductive relation to elements of said auxiliary and oscillator systems, and an indicator coupled to both of said systems.

17. In apparatus for electromagnetic inspection of material, the combination which comprises, an oscillator system, an energizing coil connected as a tuning element in said oscillator system, an auxiliary system, means for energizing said auxiliary system solely by said oscillator system, a secondary circuit coupled to said oscillator system and to said auxiliary system, means for establishing an inductive relation between an element of said secondary circuit and said energizing coil whereby a voltage is induced in said secondary circuit, means for balancing said voltage against a voltage established in said auxiliary system, means for passing material to be inspected in electromagnetic relation to elements of said secondary circuit and said oscillator system, and an indicating device coupled to said secondary circuit.

18. In apparatus for electromagnetic inspection of material, the combination which comprises, an oscillator system, an energizing coil connected as a tuning element in said oscillator system, an auxiliary system, an auxiliary coil connected as a tuning element in said auxiliary system, means for energizing said auxiliary system solely by said oscillator system, a secondary circuit including a secondary coil, means for establishing an inductive relation between an element of said secondary circuit and said energizing coil whereby a voltage is induced in said secondary circuit, means for balancing said voltage against a voltage established in said auxiliary system, means for coupling the fields of said secondary coil and of said energizing coil to material to be inspected, and an indicator device coupled to said secondary circuit.

19. In apparatus for electromagnetic inspection of material, the combination which comprises, a feedback oscillator system having an energizing coil and at least one output circuit, said coil being effectively connected in said output circuit and thereby forming a tuning element of said system, an auxiliary system, an auxiliary coil connected as a tuning element in said auxiliary system, means for energizing said auxiliary system solely by effective coupling with an output circuit of said oscillator system, a secondary circuit including first and second secondary coils, means for establishing an inductive relation between one of said secondary coils and said energizing coil whereby a first voltage is induced in said secondary circuit, means for establishing an inductive relation between the other of said secondary coils and said auxiliary coil whereby a second voltage is induced in said secondary circuit, means for balancing said first and second voltages, means for passing material to be inspected through the fields of at least two of said coils, and an indicator device coupled to said secondary circuit.

THEODORE ZUSCHLAG.

CERTIFICATE OF CORRECTION.

Patent No. 2,329,810.  September 21, 1943.

THEODORE ZUSCHLAG.

It is hereby certified that error appears in the printed specification of the above numbered patent requiring correction as follows: Page 2, first column, line 2-3, for "secondries" read --secondaries--; page 3, first column, line 9, for "results" read --result--; and second column, line 73, for "deflect" read --defect--; page 4, first column, line 38, for "flows" read --flaws--; page 5, first column, line 11, claim 1, for "matrial" read --material--; lines 29 and 30, claim 2, for "ouput" read --output--; page 6, second column, line 37, claim 12, for "and" read --an--; and that the said Letters Patent should be read with this correction therein that the same may conform to the record of the case in the Patent Office.

Signed and sealed this 7th day of December, A. D. 1943.

(Seal)

Henry Van Arsdale,
Acting Commissioner of Patents.